J. B. GARDNER.
Button-Hole Casings.

No. 149,035.                      Patented March 31, 1874.

Witnesses.
Geo Gray.
F. C. Hale.

J. B. Gardner
by his attorney.
F. P. Hale.

UNITED STATES PATENT OFFICE.

JEROME B. GARDNER, OF MARLBOROUGH, MASSACHUSETTS, ASSIGNOR TO HIMSELF AND SAMUEL N. ALDRICH, OF SAME PLACE.

IMPROVEMENT IN BUTTON-HOLE CASINGS.

Specification forming part of Letters Patent No. 149,035, dated March 31, 1874; application filed March 2, 1874.

*To all whom it may concern:*

Be it known that I, JEROME B. GARDNER, of Marlborough, in the county of Middlesex and State of Massachusetts, have invented a new and useful Improvement in Button-Holes; and I do hereby declare the following to be a full, clear, and exact description of the invention, such as will enable others skilled in the art to which it pertains to make and use it, reference being had to the accompanying drawing, which forms part of this specification.

Figure 1:
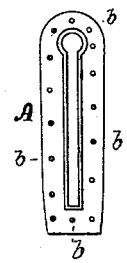
Figure 2:
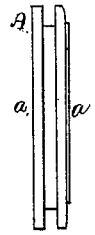
Figure 3:

In such drawing, Figure 1 denotes a plan, Fig. 2 a side elevation, and Fig. 3 an end view, of a device or button-hole constructed in accordance with my invention.

Button-holes, as commonly formed in garments, are made by cutting a slit in the cloth of the desired shape and size, and then "working" a chain or series of interlooped stitches around the outer perimeter of such slit or opening. This method of forming a button-hole, not only requires great skill and care, but the expenditure of a great amount of time, especially if such button-hole be properly formed.

The object of my invention is to provide a simple, cheap, and efficient substitute for the ordinary button-hole; and my invention consists in a molded device or button-hole made of vulcanized rubber, or other suitable material, capable of being formed or shaped in molds, such device having one or more flanges formed circumferentially upon it to lap upon the edges of an opening formed in the cloth to receive it, such flanges enabling the device to be readily secured to the garment.

In carrying out my invention I form the device of vulcanized rubber in a mold having the desired shape.

In the drawing, A denotes the article, which is a thin plate of rubber having a slit formed longitudinally through it, and two flanges, $a\ a$, extending circumferentially around it, and near the top and bottom edges thereof. Through these flanges I prefer to make a series of holes, $b$, through which thread or rivets may be passed to secure the article to the garment, but such holes may be dispensed with, as a needle could be passed through the flanges without them, or the device could be secured to the garment by means of cement and pressure. I would remark that leather instead of rubber may be employed, if desirable, or any material capable of being molded into the desired shape.

In the application of my device to a garment, a hole is to be cut in the latter in the desired location, such hole having an area somewhat less than that of the device diminished by the width of the flanges. The device is next introduced into the hole, and the edges of the cloth inserted in the groove formed between the flanges, when the parts may be readily secured together by sewing or otherwise, as stated, the flanges thus lapping upon the edges of the cloth, serving to protect the same, and to impart a neat and perfect finish thereto.

What I claim as my invention is—

As a new article of manufacture, the above-described molded button-hole casing, made of vulcanized rubber, or of any suitable flexible material capable of being formed or shaped in molds, substantially as set forth.

In testimony that I claim the foregoing I have hereunto set my hand this 24th day of February, 1874.

JEROME B. GARDNER.

Witnesses:
S. J. SHAW,
NAHUM WITHERTEN.